US011269234B2

(12) United States Patent
Chang et al.

(10) Patent No.: US 11,269,234 B2
(45) Date of Patent: Mar. 8, 2022

(54) REFLECTIVE DISPLAY DEVICE

(71) Applicant: E Ink Holdings Inc., Hsinchu (TW)

(72) Inventors: Chia-Chi Chang, Hsinchu (TW);
Chih-Chun Chen, Hsinchu (TW);
Chi-Ming Wu, Hsinchu (TW);
Yi-Ching Wang, Hsinchu (TW);
Jia-Hung Chen, Hsinchu (TW);
Cheng-Hsien Lin, Hsinchu (TW)

(73) Assignee: E Ink Holdings Inc., Hsinchu (TW)

( * ) Notice: Subject to any disclaimer, the term of this patent is extended or adjusted under 35 U.S.C. 154(b) by 125 days.

(21) Appl. No.: 16/521,584

(22) Filed: Jul. 24, 2019

(65) Prior Publication Data

US 2020/0225551 A1 Jul. 16, 2020

(30) Foreign Application Priority Data

Jan. 11, 2019 (TW) ................................. 108101252

(51) Int. Cl.
*G02F 1/167* (2019.01)
*G02F 1/1677* (2019.01)
(Continued)

(52) U.S. Cl.
CPC .......... *G02F 1/1677* (2019.01); *G02F 1/1368* (2013.01); *G02F 1/167* (2013.01);
(Continued)

(58) Field of Classification Search
CPC ............. G02F 1/1368; G02F 1/133512; G02F 1/133514; G02F 1/1339; G02F 1/13454;
(Continued)

(56) References Cited

U.S. PATENT DOCUMENTS 6,992,718 B1 * 1/2006 Takahara .......... G02F 1/133553
348/333.09
7,223,008 B2 5/2007 Henriet et al.
(Continued)

FOREIGN PATENT DOCUMENTS

CN 105807467 A 7/2016
CN 206618929 U 11/2017
(Continued)

OTHER PUBLICATIONS

Corresponding Taiwan office action dated Oct. 24, 2019.

*Primary Examiner* — Brandi N Thomas
(74) *Attorney, Agent, or Firm* — CKC & Partners Co., LLC

(57) ABSTRACT

A reflective display device includes a thin-film transistor (TFT) array substrate, a front panel laminate (FPL), a front protection sheet, a back protection sheet, a light blocking layer, and a light source. The front panel laminate is located on the TFT array substrate, and has a transparent conductive layer and a display medium layer. The display medium layer is located between the transparent conductive layer and the TFT array substrate. The front protection sheet is located on the front panel laminate. The back protection sheet is located below the TFT array substrate. The light blocking layer at least covers a lateral surface of the back protection sheet. The light source faces toward a lateral surface of the front panel laminate, a lateral surface of the TFT array substrate, and the lateral surface of the back protection sheet.

14 Claims, 4 Drawing Sheets

(51) Int. Cl.
*G02F 1/16755* (2019.01)
*G02F 1/1368* (2006.01)
*G02F 1/1679* (2019.01)

(52) U.S. Cl.
CPC ........ *G02F 1/16755* (2019.01); *G02F 1/1679* (2019.01); *G02F 2201/50* (2013.01); *G02F 2201/56* (2013.01); *G02F 2202/28* (2013.01); *G02F 2203/02* (2013.01)

(58) Field of Classification Search
CPC .... G02F 1/167; G02F 1/16755; G02F 1/1677; G02F 1/1679; G02F 2201/56; G02F 2203/02; G02F 1/1675; G02F 2201/50; G02F 2202/28; G02B 5/201; G02B 5/223
See application file for complete search history.

(56) References Cited

U.S. PATENT DOCUMENTS

| | | | |
|---|---|---|---|
| 7,223,009 | B2 | 5/2007 | Henriet et al. |
| 9,201,190 | B2 | 12/2015 | Tai et al. |
| 2004/0257505 | A1* | 12/2004 | Takizawa .......... G02F 1/133555 349/122 |
| 2013/0077013 | A1* | 3/2013 | Yamazaki ................ G02B 3/14 349/57 |
| 2013/0301263 | A1* | 11/2013 | Yamanaka ........ G02F 1/133526 362/235 |
| 2014/0286019 | A1* | 9/2014 | Araki .................... F21V 14/003 362/311.09 |
| 2016/0163271 | A1* | 6/2016 | Sakaigawa ........ G02F 1/133615 345/694 |
| 2017/0153488 | A1 | 6/2017 | Shin |
| 2017/0269283 | A1 | 9/2017 | Wang et al. |
| 2017/0329070 | A1 | 11/2017 | Shih et al. |
| 2018/0088262 | A1* | 3/2018 | Lee ....................... H01L 27/322 |

FOREIGN PATENT DOCUMENTS

| | | |
|---|---|---|
| TW | I533040 B | 5/2016 |
| TW | I622970 B | 5/2018 |

* cited by examiner

REFLECTIVE DISPLAY DEVICE

RELATED APPLICATIONS

This application claims priority to Taiwan Application Serial Number 108101252, filed Jan. 11, 2019, which is herein incorporated by reference.

BACKGROUND

Field of Invention

The present invention relates to a reflective display device.

Description of Related Art

In the current market of various consumer electronic products, electronic products have extensively utilized reflective display devices as display screens, such as electronic paper display devices. In general, an electronic paper display device has a front panel laminate (FPL) and a thin-film transistor (TFT) array substrate.

In an electronic paper display device, white and black charged particles in a display medium layer may be driven to move by applying a voltage to the display medium layer of the front panel laminate, such that each pixel displays a black color, a white color or a gray level. Since the electronic paper display device utilizes incident light that irradiates the display medium layer to achieve the purpose of display, the electronic paper display device needs no backlight.

Moreover, in order to reduce the total thickness of the electronic paper display device, a light source serving as front light may be disposed on a lateral surface of the electronic paper display device. However, as a result of such a configuration, a portion of light emitted by the light source enters the electronic paper display device from a lateral surface of a back protection sheet of the electronic paper display device. The light entering the electronic paper display device from the lateral surface of the back protection sheet are transmitted in an optical clear adhesive and the back protection sheet, and thus photo leakage current will occur in thin-film transistor elements of an active area through refraction, thereby forming fading to affect display quality.

SUMMARY

An aspect of the present invention is to provide a reflective display device.

According to an embodiment of the present invention, a reflective display device includes a thin-film transistor (TFT) array substrate, a front panel laminate (FPL), a front protection sheet, a back protection sheet, a light blocking layer, and a light source. The front panel laminate is located on the TFT array substrate, and has a transparent conductive layer and a display medium layer. The display medium layer is located between the transparent conductive layer and the TFT array substrate. The front protection sheet is located on the front panel laminate. The back protection sheet is located below the TFT array substrate. The light blocking layer at least covers a lateral surface of the back protection sheet. The light source faces toward a lateral surface of the front panel laminate, a lateral surface of the TFT array substrate, and the lateral surface of the back protection sheet.

In one embodiment of the present invention, the light blocking layer is black ink, white ink, or silver ink.

In one embodiment of the present invention, the light blocking layer is a black sheet, a white sheet, or a silver sheet.

In one embodiment of the present invention, the light blocking layer covers the lateral surface of the front panel laminate.

In one embodiment of the present invention, the light blocking layer covers a lateral surface of the front protection sheet.

In one embodiment of the present invention, the light blocking layer extends from the lateral surface of the back protection sheet to a lateral surface of the front protection sheet.

In one embodiment of the present invention, a height of the light blocking layer is substantially equal to a distance between a top surface of the front protection sheet and a bottom surface of the back protection sheet.

In one embodiment of the present invention, the reflective display device further includes an optical clear adhesive located between the TFT array substrate and the back protection sheet, and the light blocking layer covers a lateral surface of the optical clear adhesive.

In one embodiment of the present invention, the TFT array substrate includes a substrate and an active area, and the active area is located on the substrate.

In one embodiment of the present invention, the reflective display device further includes a sealant located between the front protection sheet and the substrate of the TFT array substrate.

In one embodiment of the present invention, the light blocking layer covers a lateral surface of the sealant such that the sealant is located between the light blocking layer and the front panel laminate.

In one embodiment of the present invention, the TFT array substrate includes a border area, and the sealant is located between the border area and the light blocking layer.

In one embodiment of the present invention, the TFT array substrate includes a border area between the sealant and the active area.

In one embodiment of the present invention, the reflective display device further includes a front light module. The front light module includes a light guide plate that is above the front protection sheet.

In the aforementioned embodiments of the present invention, because the reflective display device includes the light blocking layer that covers the lateral surface of the back protection sheet, light does not enter the back protection sheet from the lateral surface when the light source emits the light. Accordingly, the light is prevented from being transmitted in the back protection sheet below the TFT array substrate. As a result, the light does not enter the TFT array substrate through the refraction of the back protection sheet, which may prevent thin-film transistor elements of an active area of the TFT array substrate from forming photo leakage current to cause fading, thereby improving display quality. Moreover, since the light source faces toward the lateral surface of the front panel laminate, the lateral surface of the TFT array substrate, and the lateral surface of the back protection sheet, a thickness of the entire reflective display device can be reduced.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiments, with reference made to the accompanying drawings as follows.

DETAILED DESCRIPTION

Figure 1:
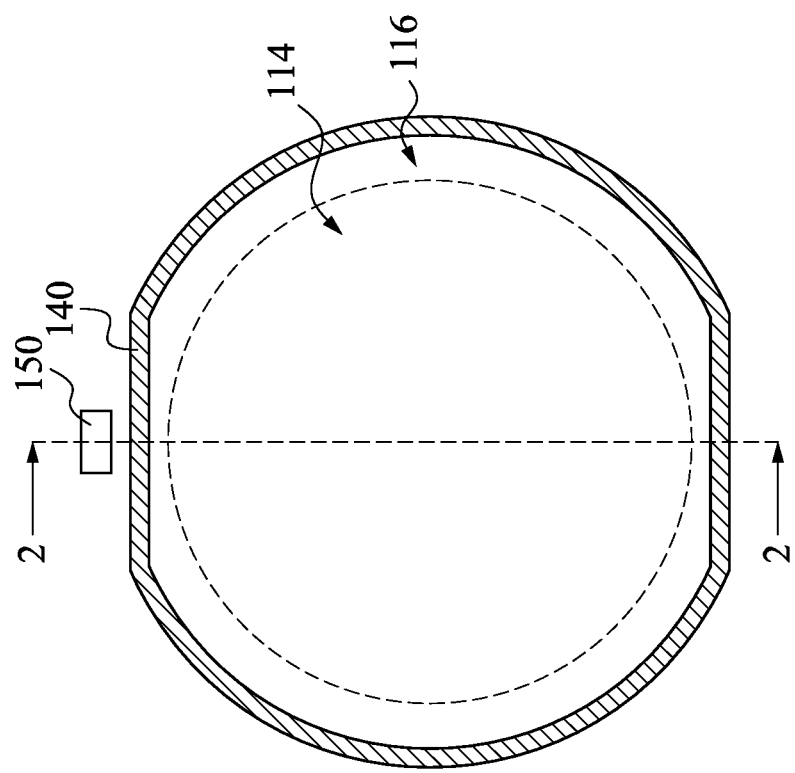
FIG. 1 is a top view of a reflective display device according to one embodiment of the present invention.

Reference will now be made in detail to the present embodiments of the invention, examples of which are illustrated in the accompanying drawings. Wherever possible, the same reference numbers are used in the drawings and the description to refer to the same or like parts.

Figure 2:
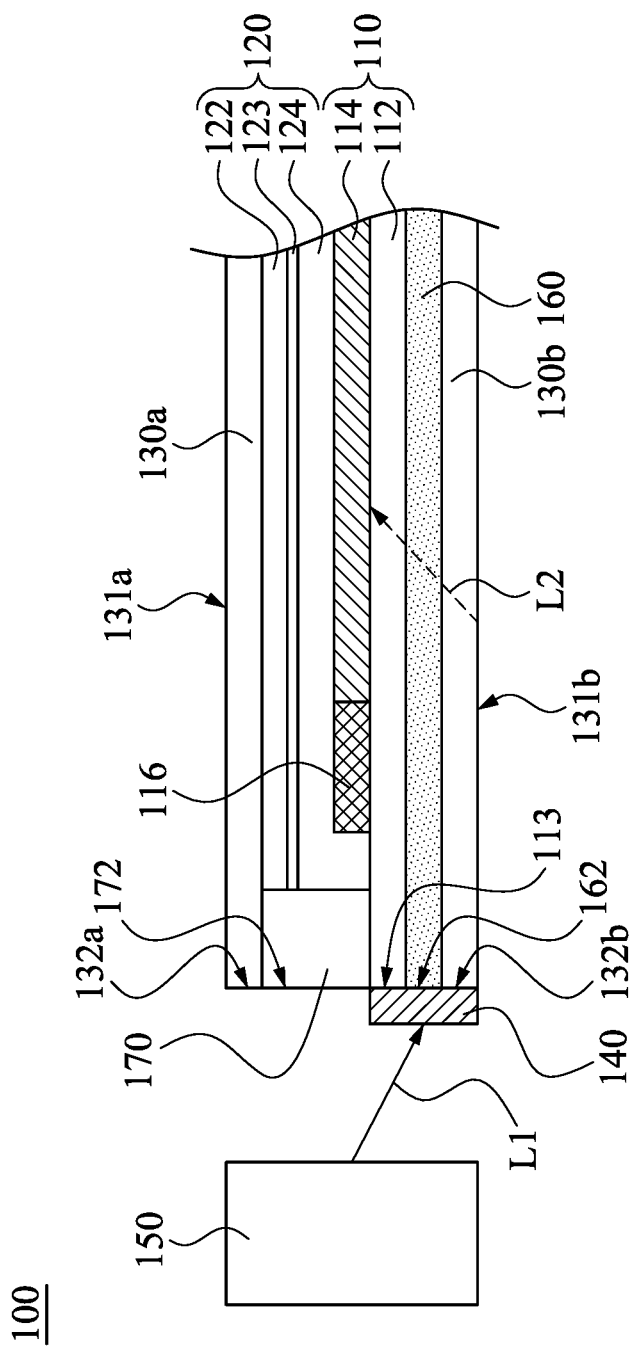
FIG. 2 is a cross-sectional view of the reflective display device taken along line 2-2 shown in FIG. 1.

FIG. 1 is a top view of a reflective display device 100 according to one embodiment of the present invention. FIG. 2 is a cross-sectional view of the reflective display device 100 taken along line 2-2 shown in FIG. 1. As shown in FIG. 1 and FIG. 2, the reflective display device 100 includes a thin-film transistor (TFT) array substrate 110, a front panel laminate (FPL) 120, a front protection sheet 130a, a back protection sheet 130b, a light blocking layer 140, and a light source 150. The front panel laminate 120 is located on the TFT array substrate 110, and has a light transmissive film 122, a transparent conductive layer 123, and a display medium layer 124. The transparent conductive layer 123 is located on a bottom surface of the light transmissive film 122. The display medium layer 124 is located between the transparent conductive layer 123 and the TFT array substrate 110. The display medium layer 124 has charged particles, such as black particles and white particles. The front protection sheet 130a is located on the front panel laminate 120. The back protection sheet 130b is located below the TFT array substrate 110. The light blocking layer 140 at least covers a lateral surface 132b of the back protection sheet 130b. The light source 150 faces toward a lateral surface of the front panel laminate 120, a lateral surface of the TFT array substrate 110, and the lateral surface 132b of the back protection sheet 130b. The light source 150 may be, for example, a light-emitting diode, but the present invention is not limited in this regard.

In addition, the TFT array substrate 110 includes a substrate 112, an active area 114, and a border area 116. The active area 114 is located on the substrate 112, and has thin-film transistor (TFT) elements. The active area 114 is a pixel area or a display area. The border area 116 surrounds the active area 114, and is a peripheral area to merely display full black or full white.

When the light source 150 emits light (e.g., light L1), because the reflective display device 100 includes the light blocking layer 140 that covers the lateral surface 132b of the back protection sheet 130b, the light L1 does not enter the back protection sheet 130b from the lateral surface 132b of the back protection sheet 130b. Accordingly, the light L1 is prevented from being transmitted in the back protection sheet 130b below the TFT array substrate 110 to form light L2. As a result, there is no light L2 entering the TFT array substrate 110 through the refraction of the back protection sheet 130b, which may prevent thin-film transistor elements of the active area 114 of the TFT array substrate 110 from forming photo leakage current to cause fading, thereby improving display quality. Moreover, since the light source 150 faces toward the lateral surface of the front panel laminate 120, the lateral surface of the TFT array substrate 110, and the lateral surface 132b of the back protection sheet 130, the thickness of the entire reflective display device 100 can be reduced.

In this embodiment, the light blocking layer 140 may be black ink, white ink, or silver ink directly coated on the lateral surface 132b of the back protection sheet 130b. In another embodiment, the light blocking layer 140 may be a black sheet, a white sheet, or a silver sheet adhered to the lateral surface 132b of the back protection sheet 130b as deemed necessary by designers. Furthermore, the reflective display device 100 further includes an optical clear adhesive (OCA) 160. The optical clear adhesive 160 is located between the TFT array substrate 110 and the back protection sheet 130b. In this embodiment, the light blocking layer 140 further covers a lateral surface 162 of the optical clear adhesive 160 and a lateral surface 113 of the substrate 112 to prevent the light L1 from entering the lateral surface 162 of the optical clear adhesive 160 and the lateral surface 113 of the substrate 112 to form the light L2. As a result, there is no light L2 entering the TFT array substrate 110 through the refraction of the back protection sheet 130b and the refraction of the optical clear adhesive 160, which may prevent fading and ensuring display quality. In this embodiment, the light blocking layer 140 may be directly formed on or in contact with the lateral surface 132b of the back protection sheet 130b, the lateral surface 162 of the optical clear adhesive 160, and the lateral surface 113 of the substrate 112, but the present invention is not limited in this regard.

The reflective display device 100 further includes a sealant 170. The sealant 170 is located between the front protection sheet 130a and the substrate 112 of the TFT array substrate 110. The border area 116 is located between the sealant 170 and the active area 114.

In addition, in this embodiment, the light blocking layer 140 does not extend onto a lateral surface 172 of the sealant 170 and a lateral surface 132a of the front protection sheet 130a. In other words, the lateral surface 172 of the sealant 170 and the lateral surface 132a of the front protection sheet 130a are exposed.

It is to be noted that the connection relationships and advantages of the elements described above will not be repeated in the following description. In the following description, other types of reflective display devices will be described.

Figure 3:
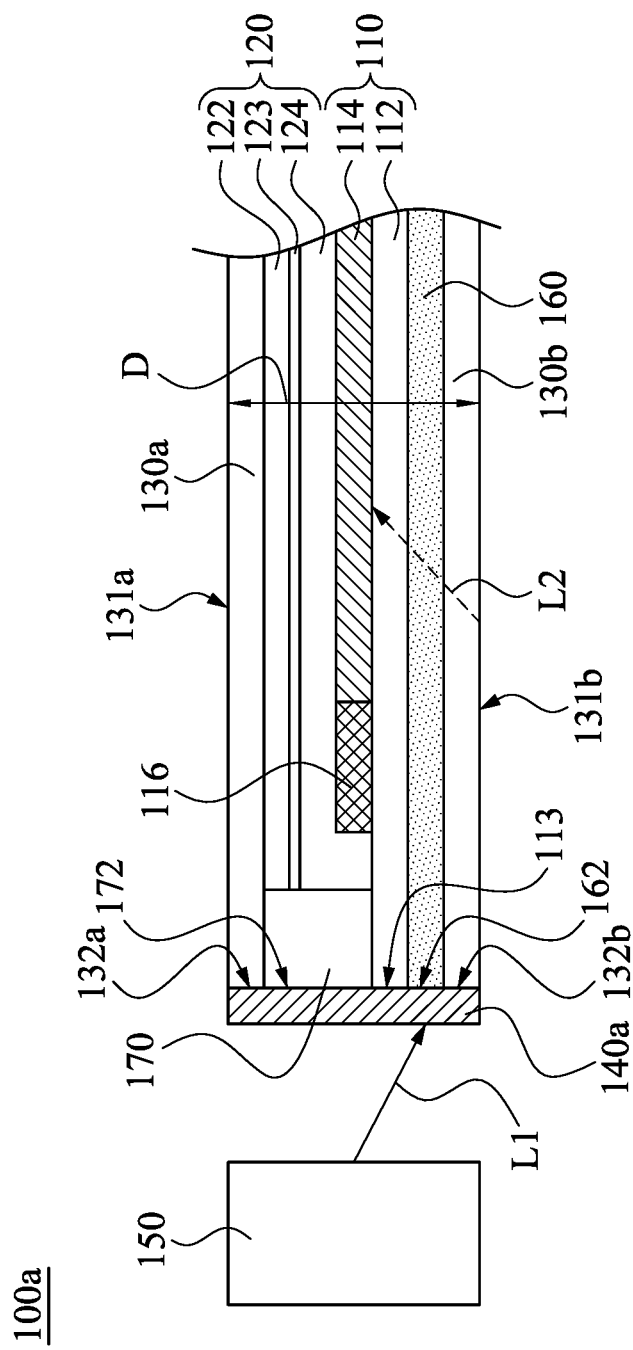
FIG. 3 is a cross-sectional view of a reflective display device according to one embodiment of the present invention, in which the cross-sectional position is the same as in FIG. 2.

FIG. 3 is a cross-sectional view of a reflective display device 100a according to one embodiment of the present invention, in which the cross-sectional position is the same as in FIG. 2. The reflective display device 100a includes the thin-film transistor (TFT) array substrate 110, the front panel laminate (FPL) 120, the front protection sheet 130a, the back protection sheet 130b, a light blocking layer 140a, the light source 150, and the sealant 170. The difference between this embodiment and the embodiment shown in FIG. 2 is that the light blocking layer 140a extends onto the lateral surface 132a of the front protection sheet 130a from the lateral surface 132b of the back protection sheet 130b. In other words, the light blocking layer 140a not only covers the lateral surface 132b of the back protection sheet 130b, the lateral surface 162 of the optical clear adhesive 160, and the lateral surface 113 of the substrate 112, but also covers the lateral surface 172 of the sealant 170 and the lateral surface 132a of the front protection sheet 130a. Therefore, a lateral surface of the front panel laminate 120 is covered by the light blocking layer 140a.

In this embodiment, the sealant 170 is located between the light blocking layer 140a and the front panel laminate 120, and is between the border area 116 and the light blocking layer 140a. A height of the light blocking layer 140a is substantially equal to a distance D that is between a top surface 131a of the front protection sheet 130a and a bottom surface 131b of the back protection sheet 130b. The light blocking layer 140a facilitates manufacturing process. For example, the light blocking layer 140a may be coated on the lateral surfaces of the back protection sheet 130b, the optical clear adhesive 160, the TFT array substrate 110, the front panel laminate 120, and the front protection sheet 130a, resulting in convenience for manufacture.

In this embodiment, the light blocking layer 140a extends onto the lateral surface 132a of the front protection sheet 130a from the lateral surface 132b of the back protection sheet 130b, thereby preventing the light L1 from entering the lateral surface 132b of the back protection sheet 130b, the lateral surface 162 of the optical clear adhesive 160, and the lateral surface 113 of the substrate 112 to form the light L2. As a result, there is no light L2 entering the TFT array substrate 110 through the refraction of the back protection sheet 130b and the refraction of the optical clear adhesive 160, which may prevent fading and ensuring display quality. In this embodiment, the light blocking layer 140a may be directly coated on or in contact with the lateral surface 132b of the back protection sheet 130b, the lateral surface 162 of the optical clear adhesive 160, the lateral surface 113 of the substrate 112, the lateral surface 172 of the sealant 170, and the lateral surface 132a of the front protection sheet 130a, but the present invention is not limited in this regard.

Figure 4:
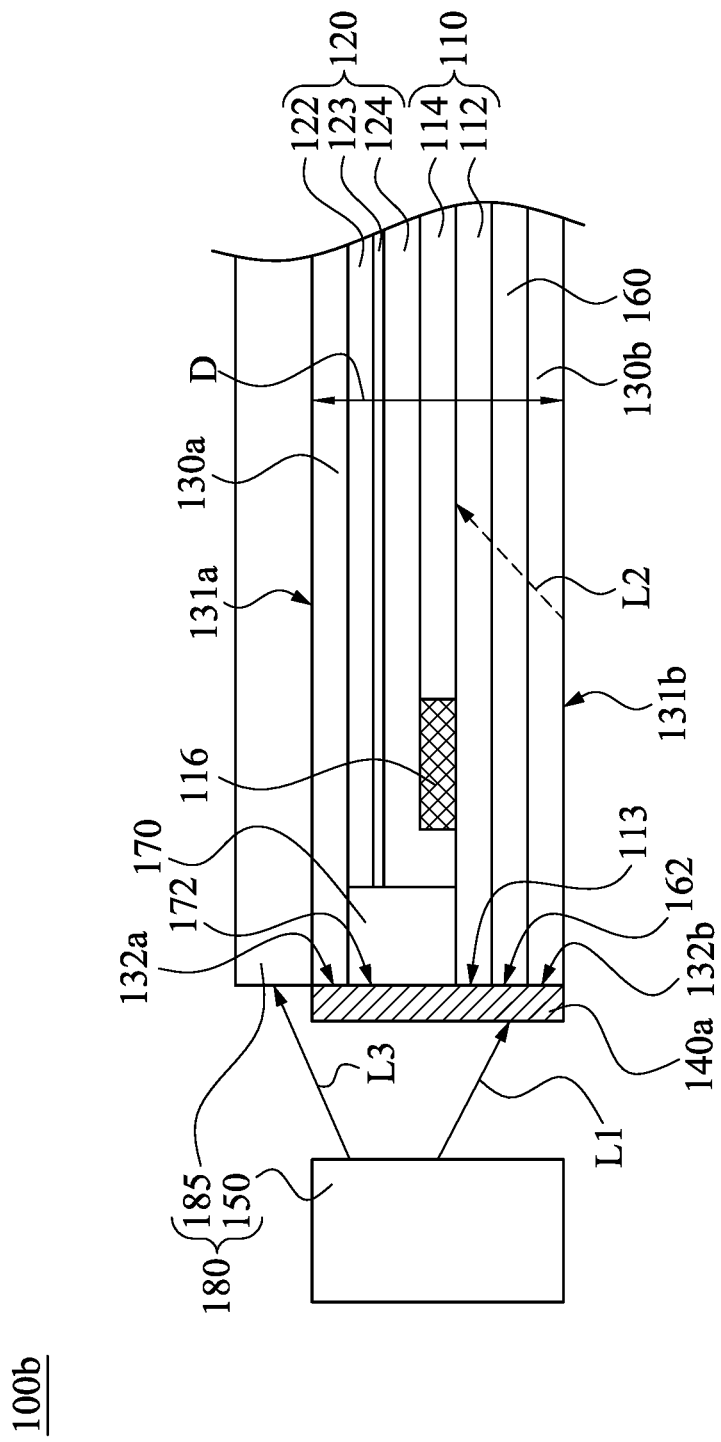
FIG. 4 is a cross-sectional view of a reflective display device according to one embodiment of the present invention, in which the cross-sectional position is the same as in FIG. 3.

FIG. 4 is a cross-sectional view of a reflective display device 100b according to one embodiment of the present invention, in which the cross-sectional position is the same as in FIG. 3. The reflective display device 100b includes the thin-film transistor (TFT) array substrate 110, the front panel laminate (FPL) 120, the front protection sheet 130a, the back protection sheet 130b, a light blocking layer 140a, the light source 150, and the sealant 170. The difference between this embodiment and the embodiment shown in FIG. 3 is that the reflective display device 100b further includes a front light module 180. The front light module 180 includes a light guide plate 185 and the light source 150. The light guide plate 185 is above the front protection sheet 130a. When the light source 150 emits light (e.g., light L3), the light guide plate 185 may receive the light L3 to provide front light for the front panel laminate 120. The light blocking layer 140a may prevent the light L1 from entering the lateral surface 132b of the back protection sheet 130b, the lateral surface 162 of the optical clear adhesive 160, and the lateral surface 113 of the substrate 112 to form the light L2. As a result, there is no light L2 entering the TFT array substrate 110 through the refraction of the back protection sheet 130b and the refraction of the optical clear adhesive 160, which may prevent fading and ensuring display quality.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention covers modifications and variations of this invention provided they fall within the scope of the following claims.

What is claimed is:

1. A reflective display device, comprising:
a thin-film transistor (TFT) array substrate;
a front panel laminate located on the TFT array substrate, and having a transparent conductive layer and a display medium layer, wherein the display medium layer is located between the transparent conductive layer and the TFT array substrate;
a front protection sheet located on the front panel laminate;
a back protection sheet located below the TFT array substrate, wherein the back protection sheet and the TFT array substrate extend in a direction;
a light blocking layer at least covering a lateral surface of the back protection sheet, wherein an inner sidewall of the light blocking layer is in direct contact with the lateral surface of the back protection sheet; and
a light source facing toward a lateral surface of the front panel laminate, a lateral surface of the TFT array substrate, and the lateral surface of the back protection sheet, wherein the light blocking layer is located between the light source and the back protection sheet, and the light source laterally overlaps the light blocking layer, the back protection sheet, and the TFT array substrate in the direction.

2. The reflective display device of claim 1, wherein the light blocking layer is black ink, white ink, or silver ink.

3. The reflective display device of claim 1, wherein the light blocking layer is a black sheet, a white sheet, or a silver sheet.

4. The reflective display device of claim 1, wherein the light blocking layer covers the lateral surface of the front panel laminate.

5. The reflective display device of claim 1, wherein the light blocking layer covers a lateral surface of the front protection sheet.

6. The reflective display device of claim 1, wherein the light blocking layer extends from the lateral surface of the back protection sheet to a lateral surface of the front protection sheet.

7. The reflective display device of claim 1, wherein a height of the light blocking layer is substantially equal to a distance between a top surface of the front protection sheet and a bottom surface of the back protection sheet.

8. The reflective display device of claim 1, further comprising:
an optical clear adhesive located between the TFT array substrate and the back protection sheet, wherein the light blocking layer covers a lateral surface of the optical clear adhesive.

9. The reflective display device of claim 1, wherein the TFT array substrate comprises a substrate and an active area, and the active area is located on the substrate.

10. The reflective display device of claim 9, further comprising:
a sealant located between the front protection sheet and the substrate of the TFT array substrate.

11. The reflective display device of claim 10, wherein light blocking layer covers a lateral surface of the sealant such that the sealant is located between the light blocking layer and the front panel laminate.

12. The reflective display device of claim 10, wherein the TFT array substrate comprises a border area, and the sealant is located between the border area and the light blocking layer.

13. The reflective display device of claim 10, wherein the TFT array substrate comprises a border area between the sealant and the active area.

14. The reflective display device of claim 1, further comprising:
   a front light module comprising a light guide plate that is above the front protection sheet.

* * * * *